United States Patent
Ichikawa et al.

(10) Patent No.: US 10,249,917 B2
(45) Date of Patent: Apr. 2, 2019

(54) POWER SOURCE DEVICE

(71) Applicants: Yazaki Corporation, Tokyo (JP); TOYOTA JIDOSHA KABUSHIKI KAISHA, Toyota-shi, Aichi (JP)

(72) Inventors: Yoshiaki Ichikawa, Kakegawa (JP); Koji Koizumi, Kakegawa (JP); Takenori Tsuchiya, Toyota (JP)

(73) Assignees: YAZAKI CORPORATION, Tokyo (JP); TOYOTA JIDOSHA KABUSHIKI KAISHA, Aichi-ken (JP)

( * ) Notice: Subject to any disclaimer, the term of this patent is extended or adjusted under 35 U.S.C. 154(b) by 363 days.

(21) Appl. No.: 14/903,455

(22) PCT Filed: Jun. 27, 2014

(86) PCT No.: PCT/JP2014/067241
§ 371 (c)(1),
(2) Date: Jan. 7, 2016

(87) PCT Pub. No.: WO2015/005147
PCT Pub. Date: Jan. 15, 2015

(65) Prior Publication Data
US 2016/0380318 A1    Dec. 29, 2016

(30) Foreign Application Priority Data
Jul. 12, 2013  (JP) ................. 2013-146251

(51) Int. Cl.
*H01M 2/12*    (2006.01)
*H01M 10/42*   (2006.01)
(Continued)

(52) U.S. Cl.
CPC ....... *H01M 10/482* (2013.01); *H01M 2/1077* (2013.01); *H01M 2/12* (2013.01);
(Continued)

(58) Field of Classification Search
CPC .. H01M 10/48–10/482; H01M 10/425; H01M 10/52; H01M 2/12–2/1294
See application file for complete search history.

(56) References Cited

U.S. PATENT DOCUMENTS

2009/0111007 A1    4/2009  Naganuma
2010/0052692 A1    3/2010  Yano et al.
(Continued)

FOREIGN PATENT DOCUMENTS

| CN | 202839793 U  | 3/2013 |
| JP | 2003-100273 A | 4/2003 |

(Continued)

OTHER PUBLICATIONS

EPO Machine Translation of CN202839793 originally published to Hashimoto on Mar. 27, 2017. (Year: 2017).*
(Continued)

*Primary Examiner* — Jonathan G Leong
(74) *Attorney, Agent, or Firm* — Sughrue Mion, PLLC (57) ABSTRACT

A power source device includes: a battery assembly including a plurality of battery cells which are aligned; a bus bar module formed by linking a plurality of bus bar storing portions which store a plurality of bus bars which link and connect electrodes of the battery assembly; a smoke exhausting duct provided on one side of the battery assembly; and a control board provided on the smoke exhausting duct and electrically connected to a voltage detection terminal for detecting a voltage of each of the battery cells. In the smoke exhausting duct, a portion where the control board is provided is in a flattened shape having a smaller height and a larger width in comparison with another portion.

6 Claims, 3 Drawing Sheets

(51) Int. Cl.
  H01M 10/48   (2006.01)
  H01M 2/20    (2006.01)
  H01M 2/10    (2006.01)
(52) U.S. Cl.
  CPC ......... *H01M 2/1241* (2013.01); *H01M 2/206* (2013.01); *H01M 10/425* (2013.01); *H01M 10/48* (2013.01); *H01M 2010/4271* (2013.01); *H01M 2200/20* (2013.01); *H01M 2220/20* (2013.01)

(56) References Cited

U.S. PATENT DOCUMENTS

| | | |
|---|---|---|
| 2011/0076521 A1 | 3/2011 | Shimizu et al. |
| 2011/0101920 A1 | 5/2011 | Seo et al. |
| 2011/0156618 A1 | 6/2011 | Seo et al. |
| 2013/0136970 A1 | 5/2013 | Kurokawa et al. |
| 2015/0144409 A1 | 5/2015 | Fujii |

FOREIGN PATENT DOCUMENTS

| | | |
|---|---|---|
| JP | 2009 105010 A | 5/2009 |
| JP | 2010 56035 A | 3/2010 |
| JP | 2011 76936 A | 4/2011 |
| JP | 2012-28186 A | 2/2012 |
| JP | 2013 25983 A | 2/2013 |
| JP | 2013 114953 A | 6/2013 |
| JP | 2013 161681 A | 8/2013 |
| JP | 2013 171746 A | 9/2013 |
| JP | 2013-179094 A | 9/2013 |
| JP | 2014-10984 A | 1/2014 |
| WO | 2013/031614 A1 | 3/2013 |
| WO | 2014/024434 A1 | 2/2014 |
| WO | 2014/03079 A1 | 3/2014 |

OTHER PUBLICATIONS

Search Report (PCT/ISA/210) dated Aug. 5, 2014, issued by the International Searching Authority in counterpart International Application No. PCT/JP2014/067241.

Written Opinion (PCT/ISA/237) dated Aug. 5, 2014, issued by the International Searching Authority in counterpart International Application No. PCT/JP2014/067241.

Office Action dated Mar. 3, 2017, by the State Intellectual Property Office of P.R. China in counterpart Chinese Application No. 201480039828.6.

Communication dated Jun. 8, 2016, issued by the European Patent Office in counterpart European Patent Application No. 14822085.8.

Translation of Written Opinion (PCT/ISA/237), dated Aug. 5, 2014, issued by the International Searching Authority in counterpart International Application No. PCT/JP2014/067241.

International Preliminary Report on Patentability (PCT/IB/373) dated Jan. 12, 2016, issued by the International Searching Authority in counterpart International Application No. PCT/JP2014/067241.

\* cited by examiner

POWER SOURCE DEVICE

TECHNICAL FIELD

The present invention relates to a power source device and, in particular, to a structure of attaching of a control board to a power source device provided with a smoke exhausting duct.

BACKGROUND ART

A power source device is mounted on an electric vehicle that runs using an electric motor or on a hybrid vehicle that runs using both a combustion engine and an electric motor (see Patent Document 1). The power source device disclosed in Patent Document 1 includes: a battery assembly including a plurality of battery cells (secondary cells); a bus bar module attached to an upper portion of the battery assembly; a voltage detection line whose one side is connected to a voltage detection terminal for detecting the voltage of each battery cell; a smoke exhausting duct for exhausting gas generated from each battery cell when the pressure inside the battery cell rises; and a control board to which the other side of the voltage detection line is connected and which detects the voltage of each battery cell. The battery assembly is in an integrated state of being pinched by a pair of end plates and then bundled by a binding band or the like. In each battery cell, a positive electrode and a negative electrode protrude in the upper portion with an interval to each other. These battery cells are arranged in alternate orientations such that a positive electrode and a negative electrode are located adjacent to each other. Further, the bus bar module is formed by linking a plurality of bus bar storing portions for storing a plurality of bus bars for connecting a positive electrode and a negative electrode of adjacent battery cells so as to establish series connection of the battery cells.

PRIOR ART DOCUMENT(S)

Patent Document(s)

Patent Document 1: JP-A-2010-56035

SUMMARY OF THE INVENTION

Problem to be Solved by the Invention

The control board can firmly be attached to the power source device by being fastened onto the smoke exhausting duct with bolts or the like. Nevertheless, in a case that the control board is attached onto the smoke exhausting duct in such a manner, the height of the power source device increases by the height of the control board (becomes taller). This causes a problem in achieving height reduction of the power source device. Further, the control board is electrically connected to the terminal (the voltage detection terminal) of the bus bar through the connector or the like of the voltage detection line. However, in some cases, the control board is joined directly to the voltage detection terminal by soldering, pressure contact, or the like. This avoids the necessity of wiring of the voltage detection line. Nevertheless, for example, at the time of fault in the control board, replacement of the control board alone becomes difficult and hence workability is degraded.

The present invention has been devised in view of this situation. A problem to be solved is to achieve height reduction of a power source device and to improve workability onto the control board.

Solutions to the Problem

For the purpose of solving the above-mentioned problem, a power source device according to the present invention includes: a battery assembly including a plurality of battery cells which are aligned; a bus bar module formed by linking a plurality of bus bar storing portions which store a plurality of bus bars which link and connect electrodes of the battery assembly; a smoke exhausting duct provided on one side of the battery assembly; and a control board provided on the smoke exhausting duct and electrically connected to a voltage detection terminal for detecting a voltage of each of the battery cells, wherein in the smoke exhausting duct, a portion where the control board is provided is in a flattened shape having a smaller height and a larger width in comparison with another portion.

With this configuration, even when the control board is provided on the smoke exhausting duct, it is possible to avoid a structure in which the control board largely protrudes upward relative to the other portions of the smoke exhausting duct. Thus, height reduction of the power source device can be achieved.

The smoke exhausting duct may include a base portion having a gutter shape defining an exhaust passage for gas exhausted from the battery cells and a cover portion which covers the base portion, and the control board may be attached to an attaching member formed as a part or entirety of the cover portion attachable to and detachable from the base portion. With this configuration, the attaching member is formed as a part or entirety of the cover portion. Thus, even after the attaching member has been attached to the smoke exhausting duct, the attaching member alone can be removed. Thus, when the attaching member is removed from the smoke exhausting duct, handling of the control board becomes easy. Thus, for example, at the time of fault or the like in the control board, the control board alone can be removed from the attaching member and then easily replaced with a new control board.

The power source device may further include a voltage detection line, one side of which is connected to the voltage detection terminal for detecting the voltage of each of the battery cells, and which extends in an aligned direction of the battery cells, and in the bus bar module, a voltage-detection line storing groove which stores the voltage detection line may be formed. Further, the bus bar module may be attachably and detachably attached to the smoke exhausting duct. Further, the attaching member may include a lid portion which covers the base portion and a seat portion located and held between the lid portion and the base portion. In this case, it is sufficient that the control board is attachably and detachably attached to at least one of the lid portion and the seat portion.

Advantages of Invention

According to the present invention, height reduction of a power source device can be achieved, and workability onto a control board can be improved.

MODE FOR CARRYING OUT THE INVENTION

Figure 1:
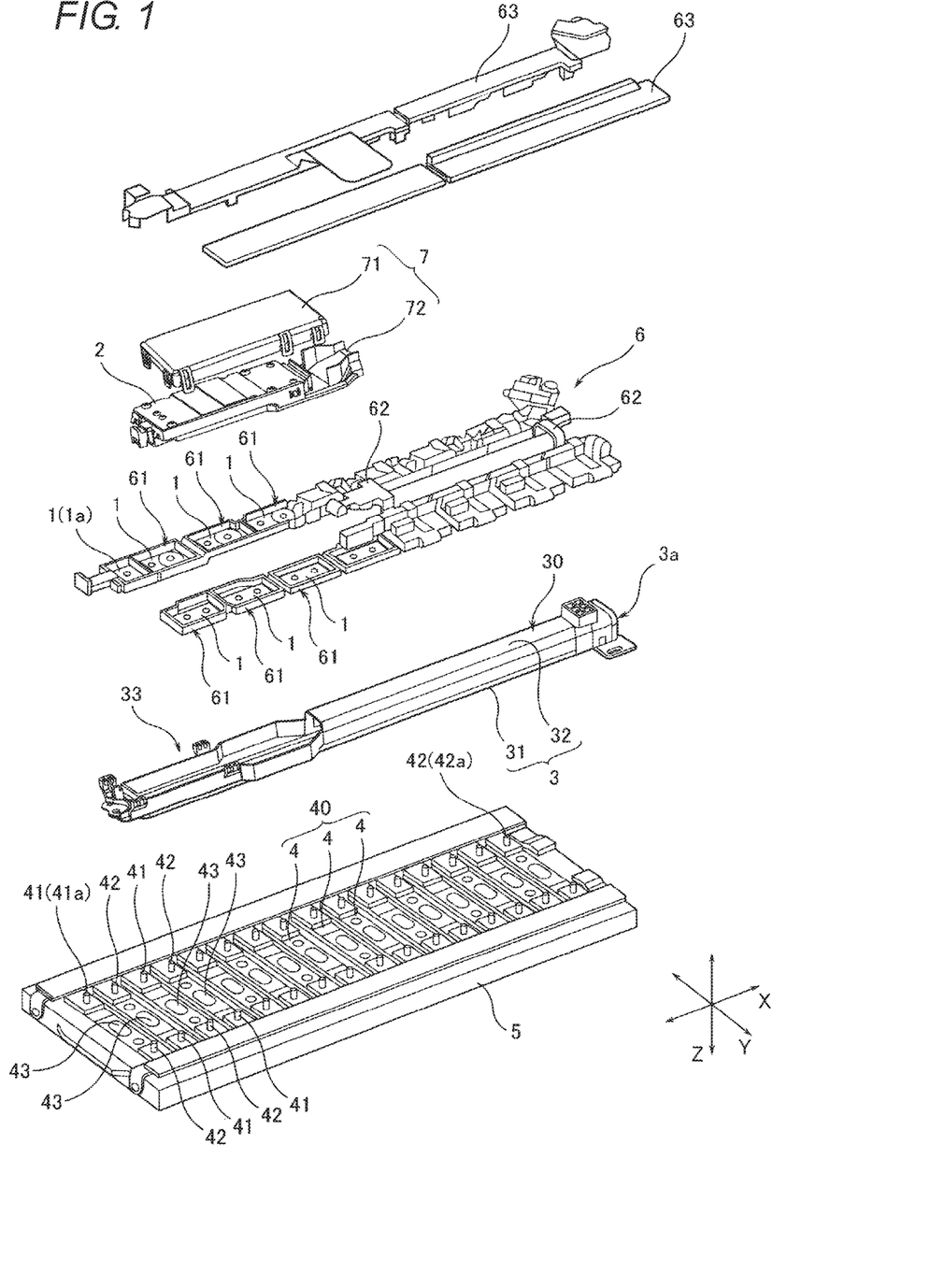
FIG. 1 is a perspective view showing a control board of a power source device according to an embodiment of the present invention and its peripheral devices, in a state of being disassembled into individual members.
Figure 2:
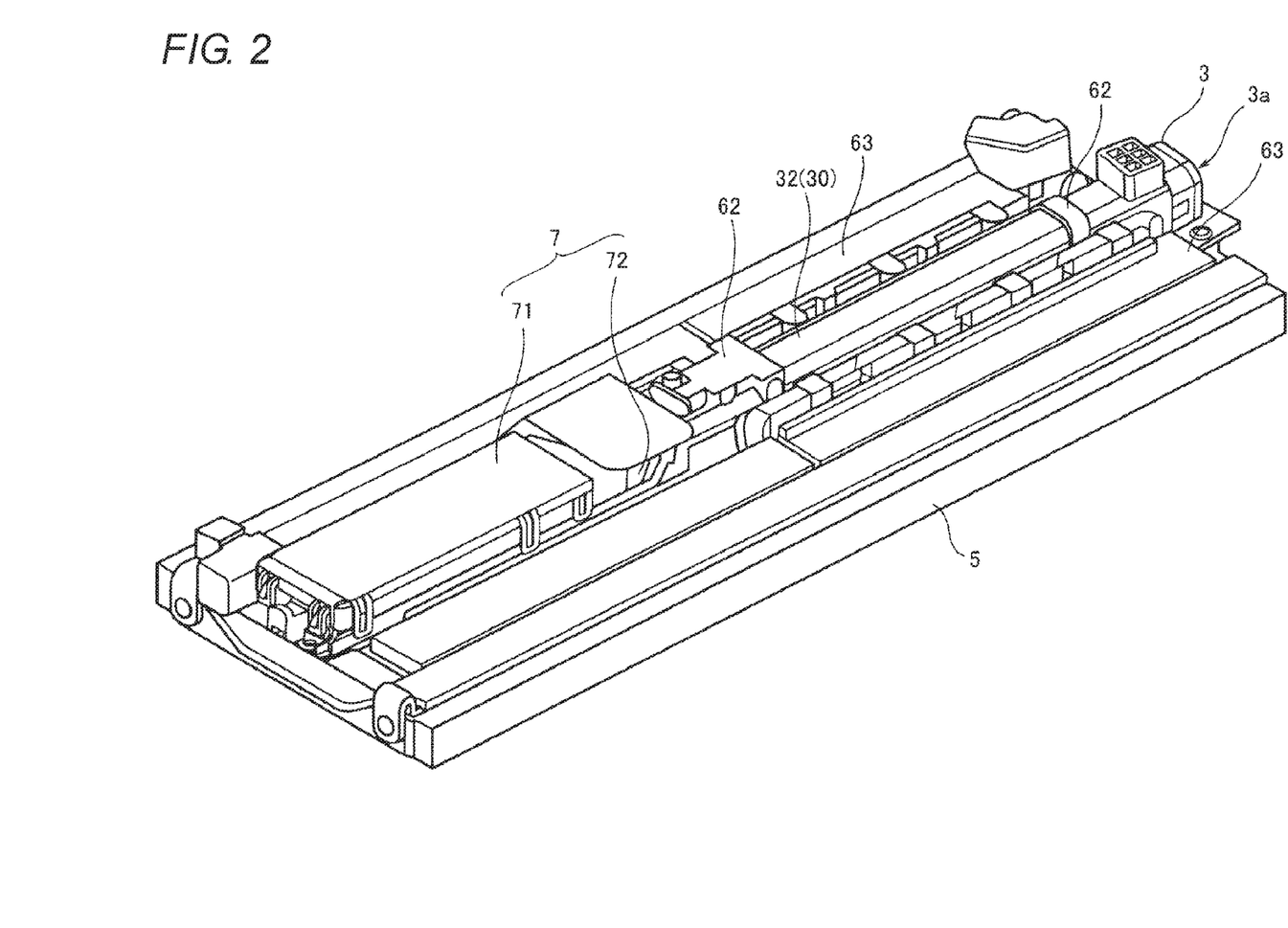
FIG. 2 is an overall perspective view showing a situation that a control board shown in FIG. 1 and its peripheral devices are assembled together.

The power source device of the present invention is described below with reference to the accompanying drawings. FIGS. 1 and 2 show a structure of attaching of a control board in a power source device according to an embodiment of the present invention. FIG. 1 is a perspective view showing the control board and its peripheral devices in a state of being disassembled into individual members. FIG. 2 is an overall perspective view showing a situation that the members shown in FIG. 1 are assembled together. For example, the power source device of the present invention can be employed as an electric power supplying apparatus for an electric motor mounted on an electric vehicle, a hybrid vehicle, or the like. Here, the application of the power source device of the present invention is not limited to this. Here, in the following description, the directions indicated by arrows X in FIG. 1 are referred to as frontward and rearward directions. Further, the directions indicated by arrows Y are referred to as right and left directions and the directions indicated by arrows Z are referred to as up and down directions. Here, in the up and down directions, the direction directing upward in FIG. 1 is identified as the upward direction (the upward side) and the direction directing downward is identified as the downward direction (the downward side). Here, these frontward and rearward directions, right and left directions, and up and down directions need not necessarily be in agreement with the individual directions (e.g., the frontward and rearward directions, the right and left directions, and the up and down directions of an automobile) in a state that the power source device is mounted on the vehicle.

As shown in FIGS. 1 and 2, the power source device according to the present embodiment includes: a battery assembly 40 including a plurality of battery cells 4 aligned to each other; a bus bar module 6 formed by linking a plurality of bus bar storing portions 61 for storing a plurality of bus bars 1 for linking and connecting electrodes 41, 42 of the battery assembly 40 together; a voltage detection line (in FIG. 2, the voltage detection line is covered by a cover member 63) one side of which is connected to a voltage detection terminal (in FIG. 2, the voltage detection terminal is covered by the cover member 63) for detecting the voltage of each battery cell 4 and which extends in the aligned direction (the frontward and rearward directions) of the battery cells 4; a smoke exhausting duct 3 provided on one side (the upper side) of the battery assembly 40; and a control board 2 provided on the smoke exhausting duct 3 and connected to the other side of the voltage detection line.

Each battery cell 4 forming the battery assembly 40 has an approximately rectangular parallelepiped shape and includes a positive electrode (e.g., an electrode 41 shown in FIG. 1) and a negative electrode (similarly, an electrode 42) which protrude respectively on one end side and on the other end side in the upper portion. Further, each electrode has a cylindrical shape and can engage with a nut. These battery cells 4 are arranged in alternate orientations such that a positive electrode 41 and a negative electrode 42 are located adjacent to each other. Then, the battery cells 4 are stored and held by a holding member (referred to as a holding case, hereinafter) 5 having an insulating property. Here, in place of the configuration that the individual battery cells 4 are stored and held by the holding case 5, for example, the battery assembly may have a configuration that a plurality of battery cells formed in a rectangular flat plate shape are pinched between a pair of plate-shaped members (end plates) and then these end plates are tied and bound by a clamping member (a band, a metal plate, or the like having a belt shape). In this case, a member (a spacer) for insulating these battery cells may intervene between adjacent battery cells.

In the battery cells 4, a gas releasing port 43 is formed between the positive electrode 41 and the negative electrode 42 (e.g., in a middle portion between the electrodes). For example, the gas releasing port 43 is formed such that an opening is fabricated in the electrode surface (the face where the positive electrode 41 and the negative electrode 42 protrude) of the battery cell 4 and then the opening portion is closed by a thin metal film or the like. By virtue of this, when gas is generated in the inside of the battery cells 4 so that the pressure in the battery cell increases to a predetermined value or higher, the metal film fractures so that the gas is released through the gas releasing port 43.

For example, a bus bar 1 is formed by performing punching work, bending work, or the like on a flat conductor plate. Then, the bus bar 1 is provided with holes (electrode holes) through which a positive electrode 41 and a negative electrode 42 of adjacent battery cells 4 are inserted. When nuts or the like are screwed onto the electrodes 41 and 42 inserted and protruding through the electrode holes, the bus bar 1 is fixed to the battery assembly 40 and then connect between the positive electrode 41 and the negative electrode 42 of adjacent battery cells 4 so as to establish series connection. Here, in the bus bar 1 for establishing series connection of the positive electrode 41 and the negative electrode 42 of adjacent battery cells 4, two electrode holes are formed. In contrast, in the bus bar 1 (1a) connected to the overall positive electrode 41 (41a) or the overall negative electrode 42 (42a) of the battery assembly 40, one electrode hole is formed. Further, the bus bar 1 is connected to the voltage detection terminal to which conduction with the voltage detection line is established. Then, for example, the voltage detection terminal is formed by performing punching work, bending work, or the like on a flat conductor plate.

The control board 2 is an electronic component for detecting the voltage of each battery cell 4 and then controlling the charging, discharging, or the like of each battery cell 4 on the basis of the detected voltage value. The control board 2 includes: a microcomputer; a detection circuit for the voltage, the electric current, the temperature of each battery cell 4; and the like. The control board 2 is connected to one end side of the voltage detection line and then the other end side of the voltage detection line is connected individually to the voltage detection terminal of each bus bar 1 so that the control board 2 is electrically connected to each battery cell 4. By virtue of this, the voltage of each battery cell 4 can be outputted to the control board 2 through the voltage detection terminal and the voltage detection line. For example, the voltage detection line may include a conductor having electrical conductivity and from an insulation cover for covering the outer periphery of the conductor. The conductor may include a plurality of core wires which are twisted together or, alternatively, may include a single core wire. In this case, in the control board 2, a connector 21 for connecting the voltage detection line is provided. Then, when a connector for connection provided on one end side of the voltage detection line is connected to the connector 21, the voltage detection line can be electrically connected to the control board 2. By virtue of this, connection of the voltage detection line to the control board 2 and removal of the voltage detection line from the control board 2 can easily be performed. The connection between the voltage detection line and the voltage detection terminal may be performed by employing a connector for connection provided on the other end side of the voltage detection line or, alternatively, may be performed by joining by soldering or the like.

In the bus bar module 6, a plurality of bus bar storing portions 61 formed by an insulating material such as resin or the like and linked by hinges or the like extend in the frontward and rearward directions. Then, two sets of the plurality of bus bar storing portions 61 linked together as such are provided. The two sets of the plurality of bus bar storing portions 61 are aligned in two rows so as to form one pair. Then, any one or a plurality of the bus bar storing portions 61 of each row is linked by a linkage portion 62. The bus bar module 6 having this configuration is attached to the smoke exhausting duct 3 in an attachable and detachable manner in a configuration that the two rows of the bus bar storing portions 61 are aligned in the right and left directions with a predetermined interval (corresponding to the interval between the positive electrode 41 and the negative electrode 42 of each battery cell 4). By virtue of this, both of handling of the bus bar module 6 and the smoke exhausting duct 3 in an integrated manner and handling in a state that these are separated individually can be performed. The bus bar storing portions 61 of each row extend along the direction (i.e., in the frontward and rearward directions) of arrangement of the plurality of electrodes 41 and 42 of the battery assembly 40 that form a row on both sides in the right and left directions. Then, the bus bar storing portions 61 are linked together by the linkage portions 62 in a substantially middle portion of the frontward and rearward directions and on one end side so as to be integrated together. For example, each bus bar storing portion 61 may be surrounded by peripheral walls rising in a frame shape. Then, one bus bar 1 is stored within the peripheral walls. The stored bus bar 1 may be held by the bus bar storing portion 61, for example, by being locked by a claw portion or the like protruding from the peripheral walls rising in a frame shape. Further, in the bus bar module 6, a voltage-detection line storing groove is formed for storing the voltage detection line. For example, the voltage-detection line storing groove may extend in the frontward and rearward directions on the outer side or the inner side of the bus bar storing portions 61 forming two rows continuously to the bus bar storing portions 61 of each row. By virtue of this, the voltage detection line stored in the voltage-detection line storing groove can be wired in the frontward and rearward directions along the bus bar storing portions 61 of each row. Here, as shown in FIGS. 1 and 2, the bus bar module 6 includes the cover member 63 which can cover the bus bar 1 and the voltage detection line.

In the smoke exhausting duct 3, the portion (a unit attaching portion 33 described later) where the control board 2 is provided is in a flattened shape having a smaller height and a larger width in comparison with the other portions. By virtue of this, even when the control board 2 is provided on the smoke exhausting duct 3, a situation can be suppressed that the control board 2 largely protrudes upward relative to the smoke exhausting duct 3. Thus, height reduction of the power source device can be achieved.

In the present embodiment, the smoke exhausting duct 3 includes: a base portion 31 having a gutter shape forming an exhaust passage for gas exhausted from the battery cells 4; and a cover portion 32 for covering the base portion 31. The base portion 31 includes: a bottom portion 31a; and two walls 31b rising from both edges of the bottom portion 31a so as to oppose each other. Then, the base portion 31 is in fluid communication with the gas releasing port 43 formed in each battery cell 4 and thereby guides the gas released through the gas releasing port 43, to a gas exhaust port 3a of the smoke exhausting duct 3 so that the gas is exhausted to the outside of the power source device. The gas releasing port 43 of each battery cell 4 is in fluid communication with a plurality of gas inlets (not shown) formed in the base portion 31 (i.e., an exhaust passage for the gas). In this case, the base portion 31 extends along the gas releasing port 43 and the gas inlet is opened such as to penetrate the base portion 31 in correspondence to the opening position of the gas releasing port 43. For example, it is sufficient that the gas inlets are formed such as to be aligned in one row along the longitudinal direction (the frontward and rearward directions) of the base portion 31 and then the base portion 31 is attached onto the battery assembly 40 such that the gas inlets are positioned between the bus bar storing portions 61 extending in two rows (see FIGS. 1 and 2). Here, a sealing member (not shown) is provided in the fluid communication portion between the gas releasing port 43 of the battery cell 4 and the gas inlet of the base portion 31. Thus, the fluid communication portion is maintained in an airtight state by the sealing member so that gas leakage from the portion other than the gas exhaust port 3a of the smoke exhausting duct 3 is avoided.

The cover portion 32 is configured such that a part or the entirety thereof is attachable to and detachable from the base portion 31. Then, this attachable and detachable portion is formed as an attaching member (referred to as an attaching unit, hereinafter) 7 for attaching the control board 2. That is, the control board 2 is attached to the attaching unit 7 formed as a part or the entirety of the cover portion 32 in a manner of being attachable to and detachable from the base portion 31. The attaching unit 7 formed as a part or the entirety of the cover portion 32 serves as one of attachable and detachable component members in the smoke exhausting duct 3. Thus, when a part (the attaching unit 7) of the smoke exhausting duct 3 is removed, handling of the control board 2 becomes easy and hence workability onto the control board 2 can be improved. For example, at the time of fault or the like in the control board 2, the control board 2 alone can be removed from the attaching unit 7 and then easily replaced with a new control board.

In the present embodiment, a part of the cover portion 32 is formed to be attachable to and detachable from the base portion 31, then the attachable and detachable portion forms the attaching unit 7. In this case, the portion other than the attachable and detachable portion of the cover portion 32, that is, the portion (referred to as a duct upper face, hereinafter) 30 other than the attaching unit 7, is formed in an integrated manner of not permitting separation from the base portion 31. The base portions 31 and the duct upper face 30 form a tube-shaped space and then this space forms a part of the gas exhaust passage of the smoke exhausting duct 3. In the present embodiment, a part of the cover portion 32 forms the attaching unit 7 attachable to and detachable from the base portion 31. Instead, a configuration may be employed that the entirety of the cover portion (referred to as a duct cover, hereinafter) is attachable and detachable. In this case, it is sufficient that the entire duct cover serves as the attaching unit. Instead, a divided structure (e.g., a divided structure into two parts) may be employed that the duct cover is divided at a predetermined position. Then, any divided part among the divided parts may serve as the attaching unit.

Figure 3:
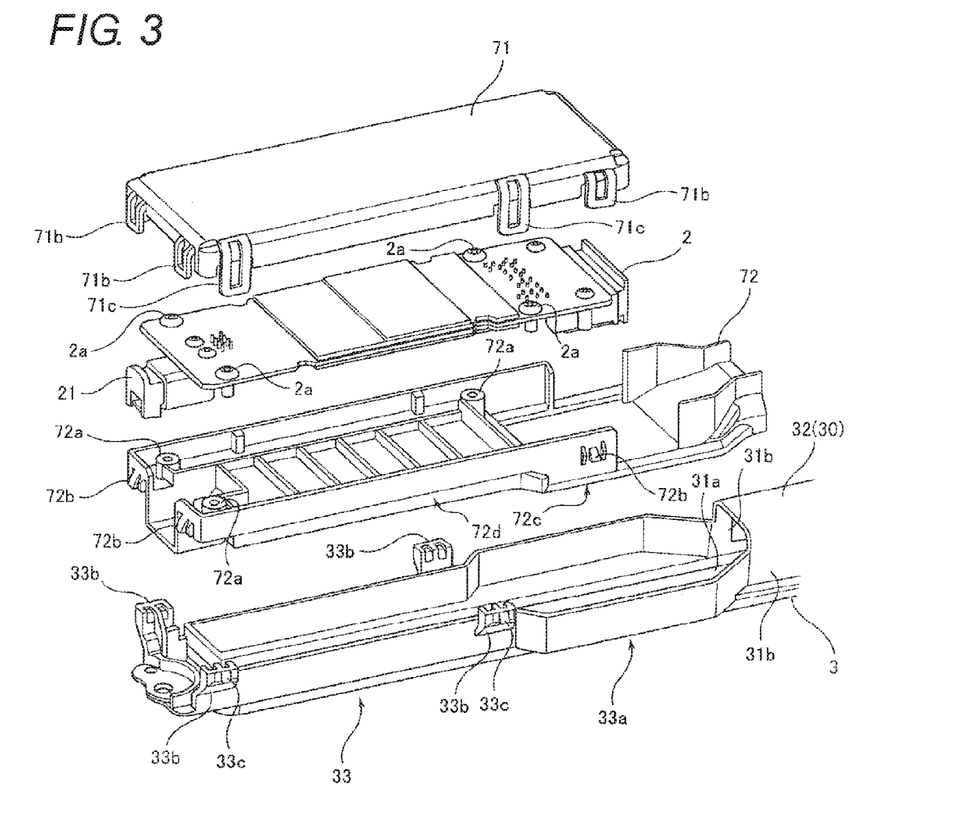
FIG. 3 is a perspective view showing an attaching member in a state of being disassembled into component members.

FIG. 3 shows the attaching unit 7 according to the present embodiment in a state of being disassembled into component members. As shown in FIG. 3, the attaching unit 7 includes: a lid portion 71 for covering the base portion 31; and a seat portion 72 located and held between the lid portion 71 and the base portion 31. In the present embodiment, the lid portion 71 and the seat portion 72 integrally form a part of the cover portion 32 and then are attached to the base portion 31 in an attachable and detachable manner so as to cover the base portion 31. The lid portion 71 and the seat portion 72 are formed in a flattened shape having a smaller height (a smaller dimension in the up and down directions) and a larger width (a larger dimension in the right and left directions) than the base portion 31. In the base portion 31, a unit attaching portion 33 having a concave shape is formed for attaching the attaching unit 7 (the lid portion 71 and the seat portion 72). In the unit attaching portion 33, the height (the dimension in the up and down directions) of the two walls 31b of the base portion 31 is reduced to approximately the half and, further, a part (a portion corresponding to the attaching unit 7) of the cover portion 32 is cut off so that the bottom portion 31a is exposed to the outside. Further, the unit attaching portion 33 includes: a wide portion 33a formed by widening the base portion 31 in correspondence to the width (the dimension in the right and left directions) of the lid portion 71 and the seat portion 72; and protruding portions 33b protruding in portions where the height of the wall 31b is reduced. Then, the wide portion 33a and the protruding portions 33b support and hold the seat portion 72. By virtue of this, even when the attaching unit 7 is attached to the unit attaching portion 33, a situation is suppressed that the attached attaching unit 7 largely protrudes from the duct upper face 30. Thus, height reduction of the power source device can be achieved. In this case, the wide portion 33a abuts against the bottom face 72c of the seat portion 72 so as to support the seat portion 72. Then, the protruding portions 33b abut against the recesses 72d that raise the bottom face 72c of the seat portion 72, and thereby support the seat portion 72. The supporting positions (the positions in the up and down directions) for the seat portion 72 by the wide portion 33a and the protruding portions 33b are not limited to particular ones and may be set up in correspondence to the height (the dimension in the up and down directions) of the attaching unit 7 such that a situation may be avoided that the attached attaching unit 7 largely protrudes from the duct upper face 30.

The control board 2 is attached to at least one of the lid portion 71 and the seat portion 72. FIG. 3 shows an exemplary configuration that the control board 2 is attached to the seat portion 72. In this case, the seat portion 72 is placed on the unit attaching portion 33 so as to close the upper portion of the unit attaching portion 33. By virtue of this, a tube-shaped space formed by the base portion 31, the duct upper face 30, and the attaching unit 7 (specifically, the seat portion 72) forms the gas exhaust passage of the smoke exhausting duct 3. In the seat portion 72, the control board 2 is attached on a side (the upper side) opposite to the side (the lower side) of placement onto the unit attaching portion 33. The method of attaching the control board 2 is not limited to particular one. However, in the present embodiment, attaching screws 2a inserted into the screw holes of the control board 2 are screwed into screwing portions 72a provided in the seat portion 72 so that attaching is achieved. Thus, attaching of the control board 2 to the seat portion 72 and removal from the seat portion 72 can easily be performed. However, as long as attaching and removal of the control board 2 are easy, for example, an engagement portion may be provided in any one of the control board 2 and the seat portion 72 and a to-be-engaged portion may be provided in the other one. Then, these may be engaged with each other so that the control board 2 may be attached to the seat portion 72. The lid portion 71 is formed in a flat plate shape corresponding to the plan shape of the control board 2 and covers the control board 2 attached to the seat portion 72.

The lid portion 71 and the seat portion 72 can be integrated together by a method that engagement portions provided in one are engaged with to-be-engaged portions provided in the other. In the configuration shown in FIG. 3, engagement protrusions 72b are provided as engagement portions in the seat portion 72 and then elastically deformable engagement pieces 71b having an aperture into which the engagement protrusion 72b is fit so that engagement is achieved are provided as to-be-engaged portions in the lid portion 71. Thus, when the engagement protrusions 72b are engaged with the engagement pieces 71b, the seat portion 72 to which the control board 2 has been attached is locked to the lid portion 71 so that these can be integrated together. Further, the lid portion 71 and the unit attaching portion 33 can be integrated together by a method that engagement portions provided in one are engaged with to-be-engaged portions provided in the other. In the configuration shown in FIG. 3, engagement protrusions 33c serving as engagement portions are provided in the unit attaching portion 33 (specifically, the protruding portions 33b) and then elastically deformable engagement pieces 71c having an aperture into which the engagement protrusion 33c is fit so that engagement is achieved are provided as to-be-engaged portions in the lid portion 71. Thus, when the engagement protrusions 33c are engaged with the engagement pieces 71c, the unit attaching portion 33 and the lid portion 71 (in other words, the lid portion 71 and the seat portion 72 having been integrated together) can be locked and integrated together. That is, the attaching unit 7 can be attached to the smoke exhausting duct 3. Here, at the time that the attaching unit 7 is to be attached to the smoke exhausting duct 3, the lid portion 71 and the seat portion 72 to which the control board 2 has been attached may first be integrated together and then these may be integrated with the unit attaching portion 33. Alternatively, the lid portion 71, the seat portion 72, and the unit attaching portion 33 may simultaneously be integrated together. In a case that such simultaneous integration is to be performed, it is sufficient that the seat portion 72 to which the control board 2 has been attached is placed on the unit attaching portion 33, then the lid portion 71 is positioned on the seat portion 72, and then the engagement pieces 71b and the engagement protrusions 72b as well as the engagement pieces 71c and the engagement protrusions 33c are individually engaged together substantial at the same time. By virtue of this, these can be attached and integrated together in a manner that the seat portion 72 is pinched between the lid portion 71 and the unit attaching portion 33.

When the engagement pieces 71b and 71c and the engagement protrusions 72b and 33c are relatively moved such as to approach to each other in the up and down directions so that the engagement protrusions 72b and 33c abut against the tips of the engagement pieces 71b and 71c, the engagement pieces 71b and 71c perform elastic warpage deformation such as to spread outward and thereby run upon the engagement protrusions 72b and 33c. Then, when the engagement protrusions 72b and 33c enter the apertures, elastic warpage restoration deformation occurs. By virtue of this, the engagement pieces 71b and 71c can be engaged with the engagement protrusions 72b and 33c. On the contrary, when relative movement is performed such as to depart from the engagement protrusions 72b and 33c in the up and down directions in a state that elastic warpage deformation occurs such that the engagement pieces 71b and 71c spread outward, the engagement pieces 71b and 71c run upon the engagement protrusions 72b and 33c so that the engagement protrusions 72b and 33c escape from the apertures and then the engagement pieces 71b and 71c perform elastic warpage restoration deformation. By virtue of this, the engagement between the engagement pieces 71b and 71c and the engagement protrusions 72b and 33c can be released. As such, the engagement pieces 71b and 71c can easily be engaged with the engagement protrusions 72b and 33c, and their engagement can easily be released. Thus, the attaching unit 7 (including the control board 2) can be attached to the unit attaching portion 33 (specifically, the smoke exhausting duct 3) in an attachable and detachable manner. Here, as long as the attaching unit 7 can be attached in an attachable and detachable manner, the attaching unit 7 may be attached to the unit attaching portion 33, for example, by a fitting structure, screwing, or the like.

Thus, even after the attaching unit 7 has been attached to the unit attaching portion 33, when the engagement between the engagement pieces 71c and the engagement protrusions 33c is released, the attaching unit 7 (including the control board 2) can easily be removed from the unit attaching portion 33 (specifically, the smoke exhausting duct 3). Further, the engagement between the engagement pieces 71b and the engagement protrusions 72b is released, the lid portion 71 can easily be removed from the seat portion 72. Thus, the control board 2 attached to the seat portion 72 can be exposed to the outside so that the control board 2 can easily be removed from the seat portion 72. By virtue of this, for example, at the time of fault or the like in the control board 2, a series of work can easily be performed that the control board 2 alone is removed from the seat portion 72 and then a new control board 2 having been replaced is attached to the seat portion 72.

Then, after the attaching unit 7 has been attached to the unit attaching portion 33, the connector of the voltage detection line connected to the voltage detection terminal of the bus bar 1 is connected to the connector 21 of the control board 2. By virtue of this, the control board 2 is electrically connected to the voltage detection line and hence the voltage value of each battery cell 4 can be outputted to the control board 2. In this case, the connector 21 of the control board 2 is provided in the control board 2 in a manner that even when the control board 2 is attached to the seat portion 72 and hence covered by the lid portion 71, the connector 21 is exposed to the outside.

Here, it is sufficient that the control board 2 is attached to at least one of the lid portion 71 and the seat portion 72. In the present embodiment, a configuration has been employed that the control board 2 is attached to the seat portion 72. Instead, a configuration may be employed that the control board is attached to the lid portion or, alternatively, a configuration may be employed that the control board is attached to both of the lid portion and the seat portion. For example, in a case that the control board is attached to the lid portion, a configuration may be employed that the seat portion cannot be separated from the duct upper face. This avoids the necessity of a divided structure in the cover portion. In this case, the attaching unit includes the lid portion alone to which the control board has been attached.

Thus, when the lid portion is merely removed from the seat portion, the control board can be exposed to the outside and hence the control board alone can easily be removed from the lid portion.

As such, according to the present embodiment, the unit attaching portion 33 of the smoke exhausting duct 3 and the attaching unit 7 are formed in a flattened shape having a smaller height and a larger width so that height reduction of the power source device can be achieved. Further, since the control board 2 is attached to the attaching unit 7 attachable to and detachable from the smoke exhausting duct 3, workability onto the control board 2 can be improved.

The present invention has been described above with reference to an embodiment. However the embodiment given above is merely illustration of the present invention and hence the present invention is not limited to the configurations alone in the embodiment given above. Thus, it is clear for the person skilled in the art that the present invention may be implemented in modified or changed modes within the scope of the spirit of the present invention. Thus, it is obvious that such modified or changed modes belong to the scope of the claims of the present application.

Here, the features of the embodiment of the power source device according to the present invention described above are briefly listed in the following <1> to <5>.

<1> A power source device including:
a battery assembly (40) including a plurality of battery cells (4) which are aligned;
a bus bar module (6) formed by linking a plurality of bus bar storing portions (61) which store a plurality of bus bars (1) which link and connect electrodes (41, 42) of the battery assembly;
a smoke exhausting duct (3) provided on one side of the battery assembly; and
a control board (2) provided on the smoke exhausting duct and electrically connected to a voltage detection terminal for detecting a voltage of each of the battery cells,
wherein in the smoke exhausting duct, a portion where the control board is provided is in a flattened shape having a smaller height and a larger width in comparison with another portion.

<2> The power source device according to <1>,
wherein the smoke exhausting duct includes a base portion (31) having a gutter shape defining an exhaust passage for gas exhausted from the battery cells and a cover portion (32) which covers the base portion, and
wherein the control board is attached to an attaching member (7) formed as a part or entirety of the cover portion attachable to and detachable from the base portion.

<3> The power source device according to <1> or <2>, further including a voltage detection line, one side of which is connected to the voltage detection terminal for detecting the voltage of each of the battery cells, and which extends in an aligned direction of the battery cells,
wherein in the bus bar module, a voltage-detection line storing groove which stores the voltage detection line is formed.

<4> The power source device according to any one of <1> to <3>,
wherein the bus bar module is attachably and detachably attached to the smoke exhausting duct.

<5> The power source device according to <2>,
wherein the attaching member includes a lid portion (71) which covers the base portion and a seat portion (72) located and held between the lid portion and the base portion, and
wherein the control board is attachably and detachably attached to at least one of the lid portion and the seat portion.

The present invention has been described above in detail with reference to a particular embodiment. However, it is clear for the person skilled in the art that various changes or modifications may be made without departing from the spirit and the scope of the present invention.

This application is based on a Japanese patent application (Japanese Patent Application No. 2013-146251) filed on Jul. 12, 2013, the contents of which are incorporated herein by reference.

INDUSTRIAL APPLICABILITY

According to the present invention, height reduction of a power source device can be achieved, and workability onto a control board can be improved. The present invention providing this effect is useful in the structure of attaching of a control board to a power source device provided with a smoke exhausting duct

DESCRIPTION OF REFERENCE SIGNS

1 Bus Bar
2 Control Board
3 Smoke Exhausting Duct
6 Bus Bar Module
61 Bus Bar Storing Portion
32 Cover Portion
41, 42 Electrode

The invention claimed is:

1. A power source device comprising:
a battery assembly comprising a plurality of battery cells which are aligned;
a bus bar module formed by linking a plurality of bus bar storing portions which store a plurality of bus bars which link and connect electrodes of the battery assembly;
a smoke exhausting duct provided on one side of the battery assembly; and
a control board provided on a portion of the smoke exhausting duct and electrically connected to a voltage detection terminal for detecting a voltage of each of the battery cells, a seat portion of the control board covering the portion of the smoke exhausting duct and defining an interior surface of the smoke exhausting duct,
wherein the portion of the smoke exhausting duct is in a flattened shape having side walls of a smaller height and a wide portion of a larger width in comparison with another portion of the smoke exhausting duct.

2. The power source device according to claim 1,
wherein the smoke exhausting duct comprises a base portion having a gutter shape defining an exhaust passage for gas exhausted from the battery cells and a cover portion which covers the base portion, and
wherein the control board is attached to an attaching member formed as a part or entirety of the cover portion attachable to and detachable from the base portion.

3. The power source device according to claim 1, further comprising:
a voltage detection line, one side of which is connected to the voltage detection terminal for detecting the voltage of each of the battery cells, and which extends in an aligned direction of the battery cells,
wherein in the bus bar module, a voltage-detection line storing groove which stores the voltage detection line is formed.

4. The power source device according to claim 1,
wherein the bus bar module is attachably and detachably attached to the smoke exhausting duct.

5. The power source device according to claim 2,
wherein the attaching member comprises a lid portion which covers the base portion and the seat portion located and held between the lid portion and the base portion, and
wherein the control board is attachably and detachably attached to at least one of the lid portion and the seat portion.

6. The power source device of claim 1, wherein at least one linkage portion, linking the plurality of bus bars, is formed to be placed over the smoke exhausting duct.

* * * * *